Patented June 29, 1937

2,085,693

UNITED STATES PATENT OFFICE 2,085,693

PREPARATION OF MINERAL WHITE OILS AND PRODUCTS PREPARED THEREFROM

Philip J. Byrne, Jr., Elizabeth, N. J., assignor to Standard Oil Development Company, a corporation of Delaware No Drawing. Application April 20, 1933, Serial No. 667,055

3 Claims. (Cl. 167—91)

This invention relates to the preparation of mineral white oils and relates particularly to the preparation of mineral white oils of high viscosity and products obtained therefrom.

High viscosity mineral white oils are used both internally as vehicles for carrying medicaments and as lubricants and externally in preparing salves, creams, and ointments. They are also used industrially as bakers' machinery oils, textile oils (both as wetting agents when combined with an emulsifier and as lubricants for textile machinery), candy makers' oils, fruit packers' oils, slab oils, and as other various industrial oils.

Mineral white oils are highly refined petroleum oils and in preparing these oils, petroleum distillates of high viscosities have heretofore been necessary to obtain the oils of the desired high viscosities. Mineral white oils having the desired characteristics, except that of viscosity, are readily prepared from low viscosity petroleum distillates such as spindle oils.

It has been discovered that mineral white oils of any desired high viscosities may be prepared from a distillate of low viscosity stock such as a spindle oil, by the incorporation of a material that has similar chemical properties but a very high viscosity.

The materials are selected from those polymerization products of unsaturated hydrocarbons capable of forming polymeric homologous series, and those products obtainable therefrom by hydrogenation and are of 800 to 2,000 or higher molecular weight, (as determined by the viscosity method described in Staudinger's book, "Die Hochmolekularen Organischem Verbindungen", H. Staudinger Berlin 1932 Verlag Von Julius Stringer, page 56) are excellent lubricants possessing a high viscosity, and are soluble in mineral oils. Polymeric homologous compounds according to the definition suggested by Staudinger in "Zeitschrift fur angewandte Chemie", vol. 42, (1929) page 69 are those which are formed by polymerization of the same elementary molecule and which are different from each other only by the degree of polymerization but which for the rest have the same molecular structure. They are obtained by polymerizing such unsaturated hydrocarbons as isobutylene, styrene, indene, butadiene, isoprene, and similar unsaturated hydrocarbons. Natural or synthetic rubber that has been hydrogenated may also be used. The polymerization of such compounds as isobutylene is conducted at temperatures below −10° C. with volatile halide catalysts such as boron fluoride and hydrogen chloride, though higher temperatures and other catalysts may also be used such as mercury chloride, tin foil, benzoyl peroxide, etc. These polymers may first be prepared from the unsaturated hydrocarbons, purified, and then blended with the mineral white oil or the unsaturated hydrocarbons may be incorporated into the oil, polymerized and purified. Hydrogenated polymers of unsaturated hydrocarbons may also be used. The polymers of unsaturated hydrocarbons may be hydrogenated by dissolving the polymers in an inert solvent, contacting the solution with hydrogen in the presence of a catalyst such as platinum oxide, filtering the solution to separate the catalyst and recovering the hydrogenated polymer from the inert solvent.

An object of this invention is to prepare mineral white oils of high viscosity from low viscosity petroleum oil distillates.

Other objects of the invention will be seen from the following example:

A highly refined white oil of about 30 to 33 Baumé gravity, having a viscosity of about 88 seconds at 100° F. (Saybolt) and meeting the United States Pharmacopoeia requirements as to taste, odor and acid, is taken and mixed with a purified polymer of unsaturated hydrocarbons. The mixture is then slowly subjected to heat and stirred until all of the polymer goes into solution. A resulting product passing the U. S. Pharmacopoeia tests for a white oil is obtained when a suitably purified polymer is used. Hydrogenated polymers of unsaturated hydrocarbons may be used instead of the polymers. The resulting increases in viscosity of a white oil by the addition of purified polymers are shown in the following table:

|  | Visc. at 100° F. | Visc. at 210° F. |
|---|---|---|
|  | Seconds | Seconds |
| White oil | 88 |  |
| White oil + 2% polymer | 146 | 47 |
| White oil + 3% polymer | 196 | 50½ |
| White oil + 4% polymer | 265 | 63 |

These oils are suitable in preparing salves, ointments, and cosmetic creams, as they have the advantages that they are neutral and indifferent and are readily incorporated with various medicaments and do not alter their own composition or that of the medicaments by contact with them. An ointment, cream, or salve prepared with this high viscosity mineral white oil has the advantage that excessive hardening during long storage or cold weather is avoided. Smaller amounts of waxes than those that are generally used may be used in preparing salves, creams, or ointments, with the advantage that they are softer and may be more easily removed.

A formula for a suitable cold cream prepared with this improved white oil is as follows:

| | Grams |
|---|---|
| White wax | 6.0 |
| Paraffin (M. Pt. 128–130° F.) | 5.0 |
| White ceresin (M. Pt. 145° F.) | 2.0 |
| White mineral oil | 54.5 |
| Borax—fine powder | .5 |
| Water | 32.0 |
| | 100.0 |

These improved mineral white oils are especially suitable for industrial uses, especially where it is desired to avoid the discoloration of the products being prepared. For example, if a dark oil was used in a baker's machine and if traces of the oil came in contact with the dough, a discolored bread would result. In textile machinery, a white mineral oil is likewise desirable as discoloration of the textiles is avoided if the textile comes in contact with the lubricating oil used.

The foregoing description is merely illustrative and alternative arrangement may be made within the scope of the appended claims in which it is my intention to claim all novelty as broadly as the prior art permits.

I claim:

1. A cosmetic cream comprising white beeswax, borax, and water in intimate admixture with an unctuous vehicle comprising a low viscosity white lubricating oil of petroleum origin and a viscosity increasing amount of a hydrocarbon polymer of polymeric homologous series having a molecular weight above 2,000 dissolved therein.

2. An unctuous preparation for topical use comprising a low viscosity medicinal white oil containing dissolved therein a viscosity increasing amount of a stable isobutylene polymer having a molecular weight of at least 2,000, and incorporated with medicaments and waxes.

3. Medicinal preparation comprising a stable high viscosity mineral white oil comprising a low viscosity medicinal mineral white oil and a viscosity increasing amount of a stable isobutylene polymer, said polymer having a molecular weight of at least 2,000.

PHILIP J. BYRNE, Jr.